(12) United States Patent
Agarwal et al.

(10) Patent No.: US 6,404,899 B1
(45) Date of Patent: Jun. 11, 2002

(54) DATA EMBEDDING SCHEME WITH ERROR DIFFUSION

(75) Inventors: Saurabh Agarwal, New Delhi (IN); Alok Aggarwal, Chappaqua, NY (US); Harpal Singh Bassali, New Delhi (IN); Jatin Chhugani, New Delhi (IN); Pradeep Kumar Dubey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/346,104

(22) Filed: Jul. 1, 1999

(51) Int. Cl.$^7$ ................................................ G06K 9/00
(52) U.S. Cl. .................................................... 382/100
(58) Field of Search ................................ 382/100, 232, 382/236–248, 305, 298; 380/54, 21 D; 708/622, 402; 713/176; 712/208, 222, 226

(56) References Cited

U.S. PATENT DOCUMENTS

| | | | |
|---|---|---|---|
| 5,819,289 A | * 10/1998 | Sandford, II et al. | 707/104 |
| 5,848,155 A | * 12/1998 | Cox | 380/4 |
| 5,875,249 A | * 2/1999 | Mintzer et al. | 380/54 |
| 5,960,081 A | * 9/1999 | Vynne et al. | 380/10 |
| 6,219,634 B1 | * 4/2001 | Levine | 704/201 |
| 6,222,932 B1 | * 4/2001 | Rao et al. | 382/100 |
| 6,332,031 B1 | * 12/2001 | Rhoads et al. | 382/100 |

* cited by examiner

Primary Examiner—Jayanti K. Patel
(74) Attorney, Agent, or Firm—Whitham, Curtis & Christofferson, P.C.; Stephen C. Kaufman

(57) ABSTRACT

A method for data embedding in a digital image under the constraint of a pre-specified upper bound value on the amount of change in the value of a property associated with the image. For compression tolerant data hiding in digital images, a property is selected in which the required information can be embedded. The property should be such that the value obtained from the property before and after a lossy compression does not change by a significant amount, and the change should be bounded. The property should be such that a property value as obtained from the image will not vary due to compression, but only due to malicious tampering. The value obtained from the property is stored so that the image can be verified. The complete image is considered in deciding whether to increase or decrease the property value in a particular region. The method also takes into account the fact that blocks having values of 0 or L, corresponding to the minimum and maximum property values, respectively, are incapable of change in a particular region. The method also attempts to vary even the checksum (stored information), in addition to modifying the image so that the net resultant checksum and the modified image coincide with each other.

10 Claims, 4 Drawing Sheets

DATA EMBEDDING SCHEME WITH ERROR DIFFUSION

CROSS-REFERENCE TO RELATED APPLICATION

The subject matter of this application is related to the disclosure of patent application Ser. No. 09/273,055 now U.S. Pat. No. 6,246,777 filed Mar. 19, 1999, by Saurabh Agarwal, Alok Agarwal, Harpal Singh Bassali, Jatin Chhugani, and Pradeep Kumar Dubey for "Compression-Tolerant Watermarking Scheme for Image Authentication" and assigned to a common assignee herewith. The disclosure of application Ser. No. 09/273,055 is incorporated herein by reference.

BACKGROUND OF THE INVENTION

1. Field of the Invention

The present invention generally relates to data embedding in digital images and, more particularly, to a data embedding scheme having a pre-specified upper bound on the amount of change in the value of the property altered by the process of data embedding.

2. Background Description

Traditionally, error diffusion has been used where a region of an image is modified in order to embed some information in the image. Then a negative change is made in another region of the image before information is embedded in the image so that the original state of the image is more or less maintained even after the information is embedded. This approach gives acceptable results in most of the cases, but problems arise in the case where the initial value is an extreme value, such as a predefined minimum and maximum value. If the initial value was equal to the predefined minimum value and the objective is to reduce the error by reducing its value, then the predefined minimum value obviously cannot be reduced. The error does not get diffused and tends to accumulate. In the worst case scenario it may not be possible to diffuse the error at all, and the scheme fails completely. Another fact is that this scheme first introduces an error, and then tries to subsequently diffuse it.

U.S. Pat. No. 5,785,249 to Mintzer et al. discloses an error diffusion strategy that maintains the average brightness of the image. According to this strategy, the modified pixel error is diffused by adjusting successive adjacent source pixel values away from the identified source pixel with decreasing amounts of the modified pixel error, in such a way that the total amount of the adjustment in the adjacent pixel values is equivalent to the modified pixel error and wherein the modified pixel value has incorporated the stamping information. This strategy, however, will not accommodate the case where the initial value is an extreme value.

SUMMARY OF THE INVENTION

It is therefore an object of the present invention to provide a solution to the data embedding problem under the additional constraint of a pre-specified upper bound on the amount of change in the value of the property.

For compression tolerant data hiding in digital images, a property in which the required information can be embedded is required. The property should be such that the value obtained from the property before and after a lossy compression like JPEG (Joint Picture Expert Group) compression does not change by a significant amount, and the change should be bounded. The property should be such that the value by this property as obtained from the image will not vary due to JPEG compression, but only due to malicious tampering. Thus, the value obtained from the property needs to be stored so that a comparison may be carried out and the image verified.

Now the question is how to store the value obtained from the property in a secure manner. The information can be stored in the property itself. The image can be broken into subparts, and each part can be used to store some information. This information can be called the checksum, which uniquely represents that part of the image. The value range of the property is mapped to bits, and hence bits can be stored in subparts by slightly juggling its pixels to make the property lie in a certain range that represents the required bit. While juggling pixels in the subparts, care must be taken so that the value of the property for a larger image part or the complete image, which is being stored, itself does not change. This issue is called the error diffusion.

A new approach is presented to the data embedding problem. Instead of sequentially looking at regions for data embedding, the complete picture is considered in pre-deciding whether to increase or decrease the value in a particular region. Consideration is also given to the fact that blocks having predefined minimum and maximum values, respectively, are incapable of change in a particular direction. Another very important distinction is that previous schemes try to store some checksum information and try to manipulate the image so that it still results in the same checksum. In the present approach, an attempt is made to vary the checksum (stored information) and modify the image, so that the net resultant checksum corresponds to the modified image value.

The method of the claimed invention first involves determining if the embedding can be corrected and, if so, then embedding the data with a parameter, such as L, having a first value ($|a_1-b_1|$), where $a_1$ is a number of microblocks with a property value equal to a pre-specified lower bound and an inherently embedded bit opposite of a bit to be embedded, and $b_1$ is a number of microblocks with a property value equal to a pre-specified upper bound and an inherently embedded bit opposite of a bit to be embedded. If the embedding cannot be corrected, then an integral value, i, is calculated such that the new property value corresponding to this value belongs to the same property value interval, $I_1$, and then embedding the data with a parameter, such as L, having the value ($|a_1-b_1-i|$). If no integral value exists that satisfies the above-mentioned criterion, then another integral value, k, is found that maps to a different property value interval. Then the data is embedded with a with a parameter L having a value ($|a_1-b_1-k|$). If a solution has not yet been found, then another integral value, $x_k$, is found such that the amount by which the embedding error corresponding to the embedding of the property value corresponding to this integral value exceeds the error-correcting capability is minimized. Then embedding is done using the new integral value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Consider an "image authentication system" in which some information is to be embedded into an image. A scheme for doing so calculates an M-bit sequence, to be embedded into M rectilinear blocks, each block being a subpart of the complete image. The property value of each block, which is obtained from the function representing the property, is a discrete value in steps of $\Delta$, lying in the range $[0, L]$. This value averaged over the M blocks is used as the embedding information. This information is itself a discrete value in steps of $\gamma$ from $[0 \ldots L]$. Each bit is embedded into the property value of each block. A function $f$ is defined that maps each value onto a "0" or "1", alternatively. A bit is embedded in a block by suitably changing the property value of the block so that the property value of the block does not change by more than $\Delta$. A change of $2\Delta$ is not desirable as it may produce artifacts in the image.

However, the problem with the above scheme without error diffusion is that while embedding, the net average might itself have changed, thus introducing an error in the embedding stage. Hence, the embedded value and the actual value will not match, thus leading to a problem at the verification stage. A simple solution could be to keep a count of the error introduced. If while embedding a bit these is a choice of making a change of $+\Delta$ or $-\Delta$, then a change could be made to reduce the error value. But the problem is that the blocks having property value of 0 or L can be changed only in one direction. Hence, the error introduced may not be able to be diffused.

To resolve the above problem, an error diffusion scheme is utilized. The inputs to the process are defined in block 100 as follows:
Define
- A is the set of microblocks with property value equal to 0.
- B is the set of microblocks with property value equal to L.
- C is the set of microblocks with property value between 0 and L and the inherently embedded bit being the same as bit to be embedded.
- D is the set of microblocks with property value between 0 and L and the inherently embedded bit being the opposite of the bit to be embedded.
- $A_0$ is the set of microblocks with property value 0 and the inherently embedded bit being the same as bit to be embedded.
- $A_1$ is the set of microblocks with property value 0 and the inherently embedded bit is different from the bit to be embedded.
- $B_0$ is the set of microblocks with property value L and the inherently embedded bit being the same as bit to be embedded.
- $B_1$ is the set of microblocks with property value L and the inherently embedded bit is different from the bit to be embedded.

Figure 1A:
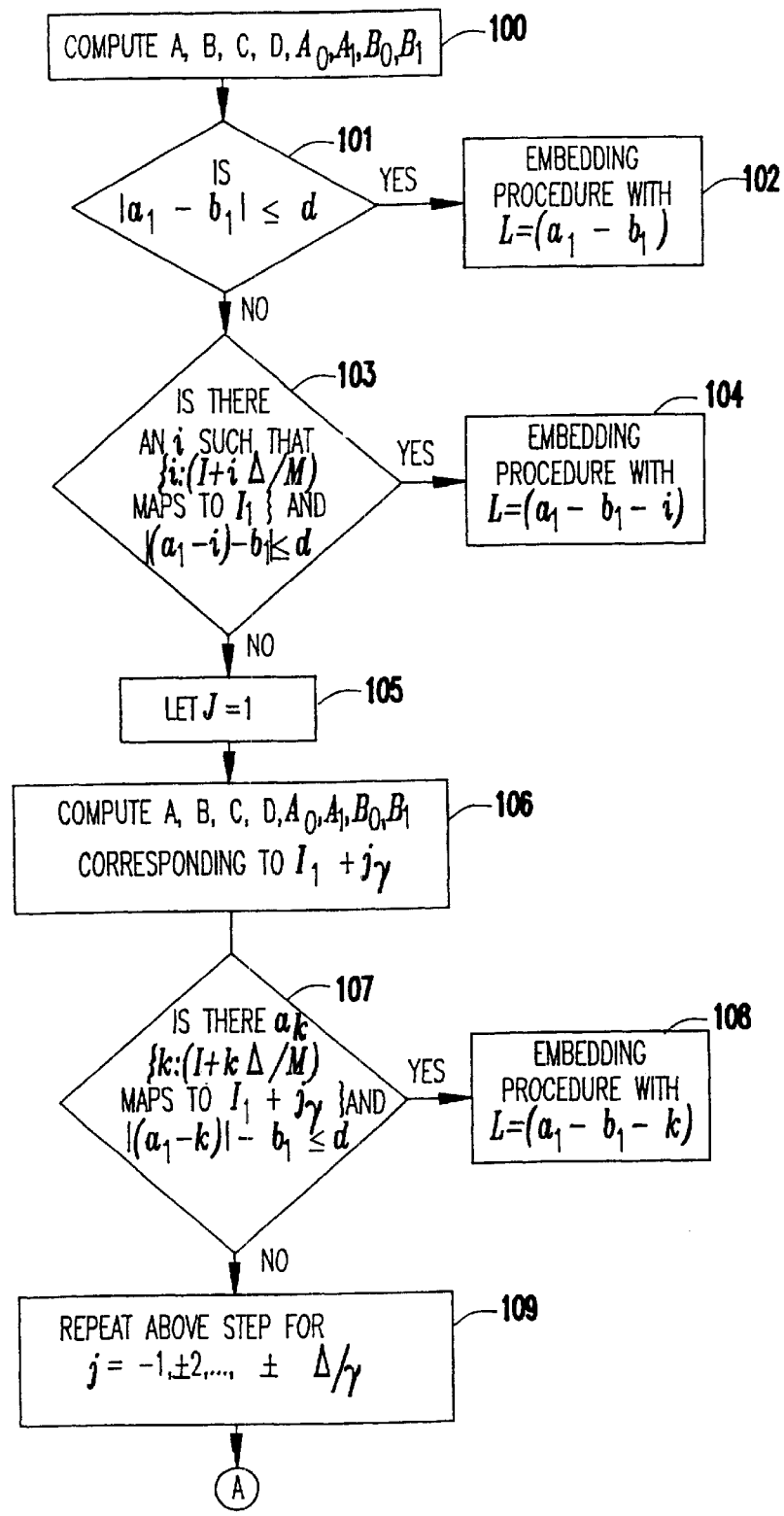
FIGS. 1A, and 1B, taken together, are a flow chart showing the logic of the Error Diffusion scheme according to the invention.

Referring now to the drawings, and more particularly to FIG. 1A, the foregoing are initially computed as the inputs 100 to the error diffusion scheme according to the present invention.
Let a=Cardinality(A).
Let b=Cardinality(B).
Let c=Cardinality(C).
Let d=Cardinality(D).
Let $a_0$=Cardinality($A_0$).
Let $a_1$=Cardinality($A_1$).
Let $b_0$=Cardinality($B_0$).
Let $b_1$=Cardinality($B_1$).
Clearly, $$a_0 + a_1 = a,$$

and $$b_0 + b_1 = b.$$

Let I=the average property value of all the blocks, and let $I_1$=quantized value of L.

Note that D blocks can be increased or decreased by $\Delta$ by choice in order to embed the required bit. Thus, the macroaverage value can be manipulated by $[-d\Delta/M, d\Delta/M]$ in a suitable manner. This controlled manipulation of the macroaverage value by D blocks can be used to compensate for the uncontrolled manipulations caused by $A_1$ and $B_1$ blocks. Thus, if $$-d\Delta \leq (a_1\Delta - b_1\Delta) \leq d\Delta,$$

then the controlled manipulation of D blocks can completely compensate for the uncontrolled manipulation.

The above inequality reduces to $$|a_1 - b_1| \leq d.$$

Figure 2:
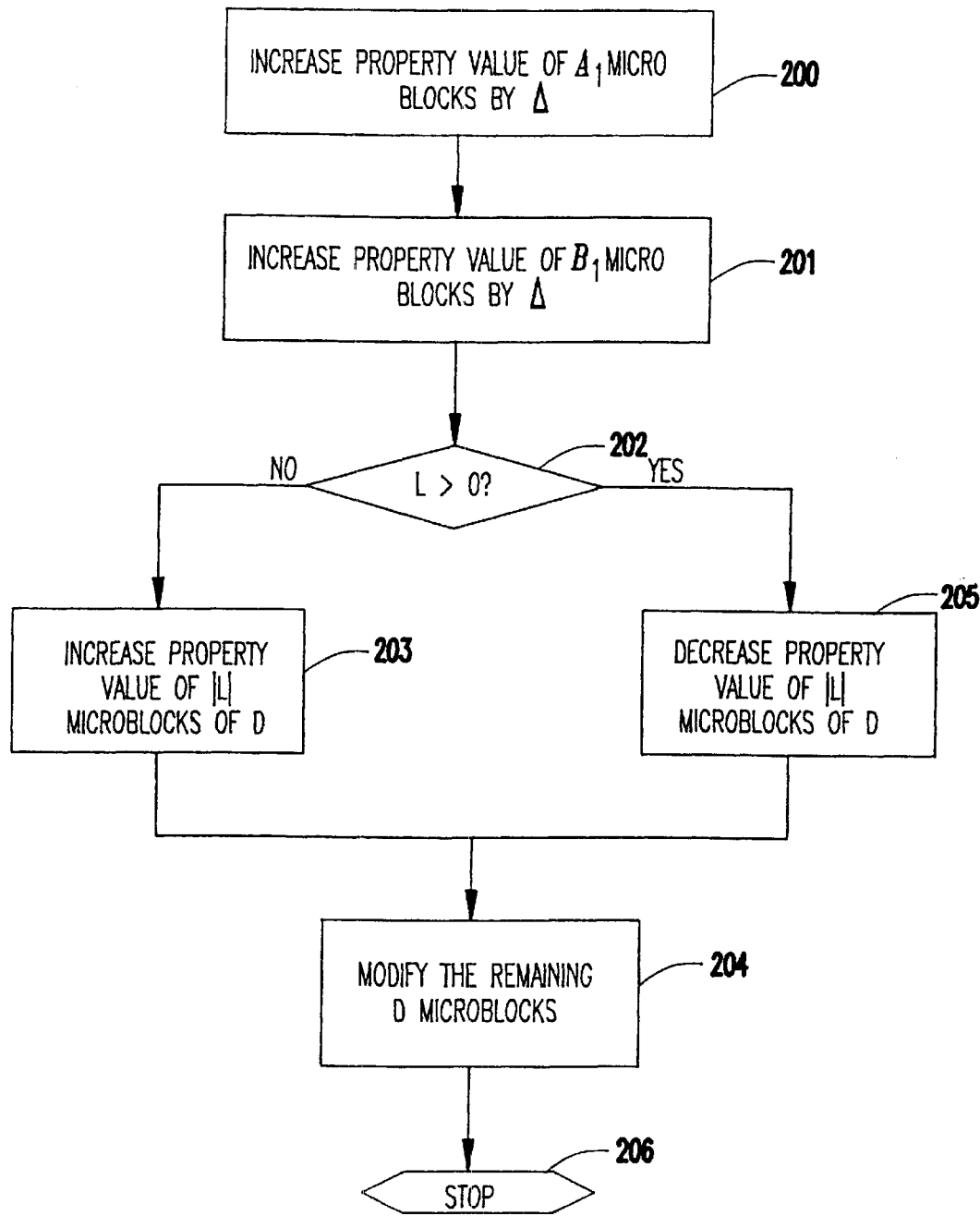
FIG. 2 is a flow chart showing the logic of the Embedding Procedure according to the invention.

If the above inequality holds, as determined in decision block 101, then the embedding procedure, described with reference to FIG. 2, is called in function block 102 with parameter $L=(a_1-b_1)$. If the above inequality is not naturally satisfied, then an attempt is made to change the macroaverage value to find a solution. The macroaverage value can be changed to any value in the interval $$\left[I_1 - \frac{\gamma}{2}, I_1 + \frac{\gamma}{2}\right],$$

so that it still maps to $I_1$. If i microblocks are changed in the above manipulation, then the macroaverage value changes by $i\Delta/M$. As determined in decision block 103, all possible choices of i are tried such that $I+i\Delta/M$ belongs to the above interval. To make the value as $I+i\Delta/M$, the value of i $a_1$'s (assuming i>0) are increased by $\Delta$ to make them a c microblock. Hence, the number of $a_1$'s get reduced by i. The new inequality then becomes:

$$|(a_1 - i) - b_1| \leq d.$$

If i≦0, then the value of i $b_1$'s need to be decreased by $\Delta$, but the inequality remains the same. If a solution is found, then, the embedding scheme shown in FIG. 2 is called with parameter $L=(a_1-b_1-i)$, as shown in function block 104. If there still is no solution, then in function block 105, j is set to 1. The macroaverage value is changed such that it quantizes to $I_1+j\gamma$ in function block 106. The new M bit embedding sequence is computed corresponding to the new macroaverage value $I_1+j\gamma$. Now, A, B, C, D, $A_0$, $A_1$, $B_0$, $B_1$ are computed as previously described.

Hence, the new macroaverage value must lie in the range $$\left[I_1 + j\gamma - \frac{\gamma}{2}, I_1 + j\gamma + \frac{\gamma}{2}\right].$$

Therefore, all k are found such that I+k$\Delta$/M lies in this range. To increase the macroaverage value by k$\Delta$/M, a change of k $a_1$'s by an amount $\Delta$ is required. Hence, the number of $a_1$'s reduces by k; and the inequality becomes:

$$|(a_1-k)-b_1| \leq d.$$

This processing is done in decision block 107 shown in FIG. 1A. If a solution is found, then the embedding scheme of FIG. 2 is called with L=($a_1$-$b_1$-k) in function block 108. Note that the values of $a_1$, $b_1$ and d correspond to the new macroaverage value of $I_1$+j$\gamma$, and that these may be different from the values obtained for $I_1$. The above procedure for j=-1, ±2, . . . ±$\Delta$/$\gamma$ repeated in function block 109 until the criteria in decision block 107 are satisfied.

Figure 1B:
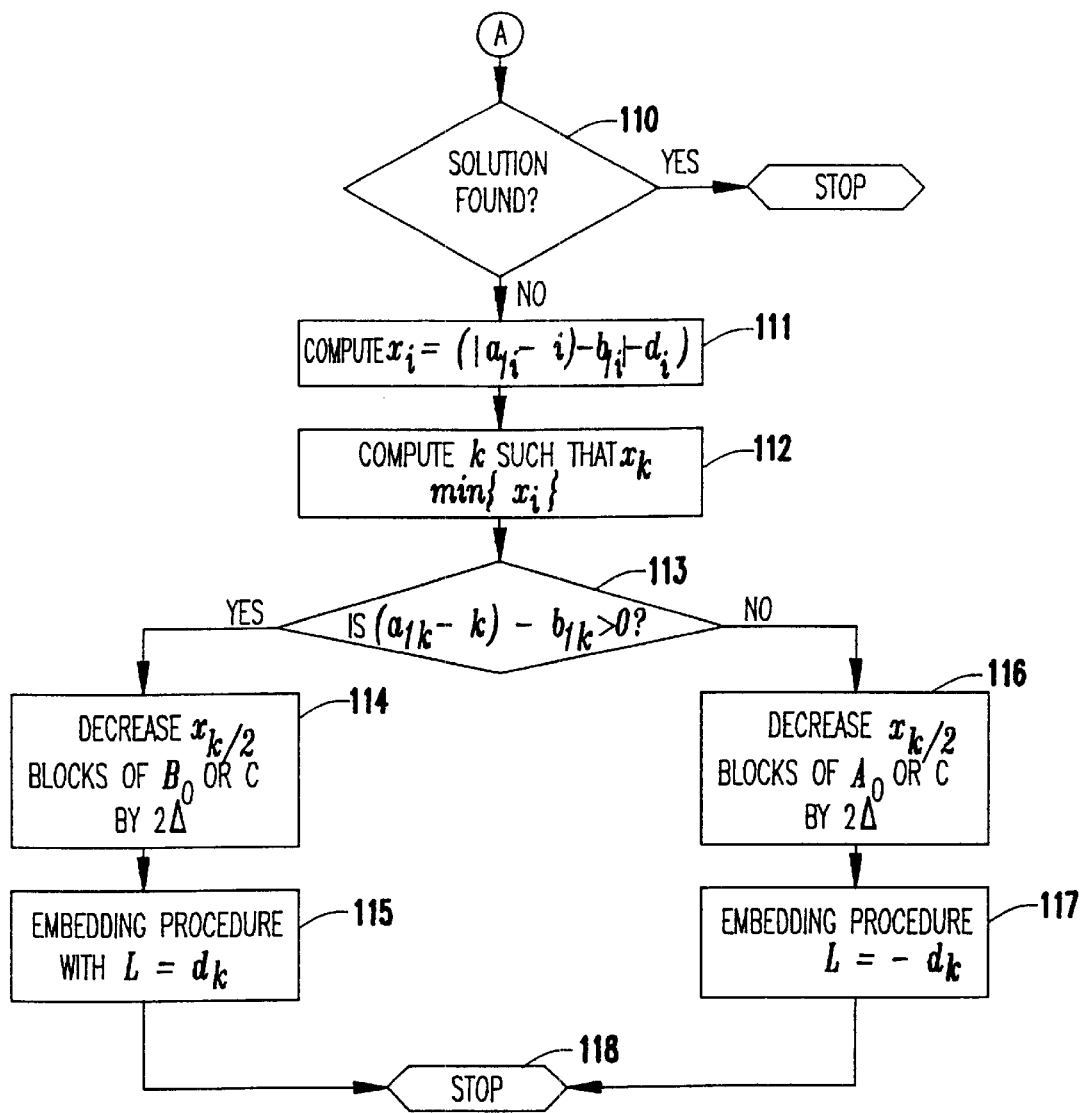

Referring next to FIG. 1B, if a solution is still not obtained, as determined in decision block 110, then the property value of some of the blocks must be changed by 2$\Delta$ (i.e., C, $A_0$, $B_0$). However, the number of such blocks is minimized. Therefore, an attempt to minimize the difference between $|a_1-b_1|$ and d is made. Hence, $x_i=|a_{1i}-b_{1i}-d_i|$ for all i=0, ±1, . . . , ±M is computed in finction block 111. In function block 112, a k is found such that $x_k$ is minimum. Then $x_k$/2 blocks have to be changed by 2$\Delta$.

If ($a_{1k}-b_{1k}>0$), as determined in decision block 113, then the error must be reduced. Hence, in function block 114, decrease $x_k$/2 blocks of $B_0$ or C by 2$\Delta$. Now the embedding scheme of FIG. 2 is called with L=$d_k$ in function block 115. If ($a_{1k}-b_{1k}\leq 0$) as determined in decision block 113, then $x_k$/2 blocks of $A_0$ or C are increased by 2$\Delta$ in function block 116. Now the embedding scheme of FIG. 2 is called with parameter L=(-$d_k$) in function block 117. After the appropriate action taken in either function block 115 or function block 117, the process stops, as shown in function block 118.

Referring now to FIG. 2, the embedding scheme with parameter L called by the process shown in FIGS. 1A and 1B begins by increasing the property value of $A_1$ microblocks by $\Delta$, as shown in function block 200. Next, in function block 201, the property value of $B_1$ microblocks is decreased by $\Delta$. A test is then made in decision block 202 to determine if the value of L is greater than 0. If L>0, then the property value of any L blocks out of the D blocks is decreased, as shown in function block 203. Similarly, if L$\leq$0 then the property value of any L blocks out of D blocks is increased, as shown in function block 205. Finally, in function block 204, the remaining D microblocks are modified in accordance with the procedure outlined in FIG. 3. As shown in function block 206, the process then stops.

Figure 3:
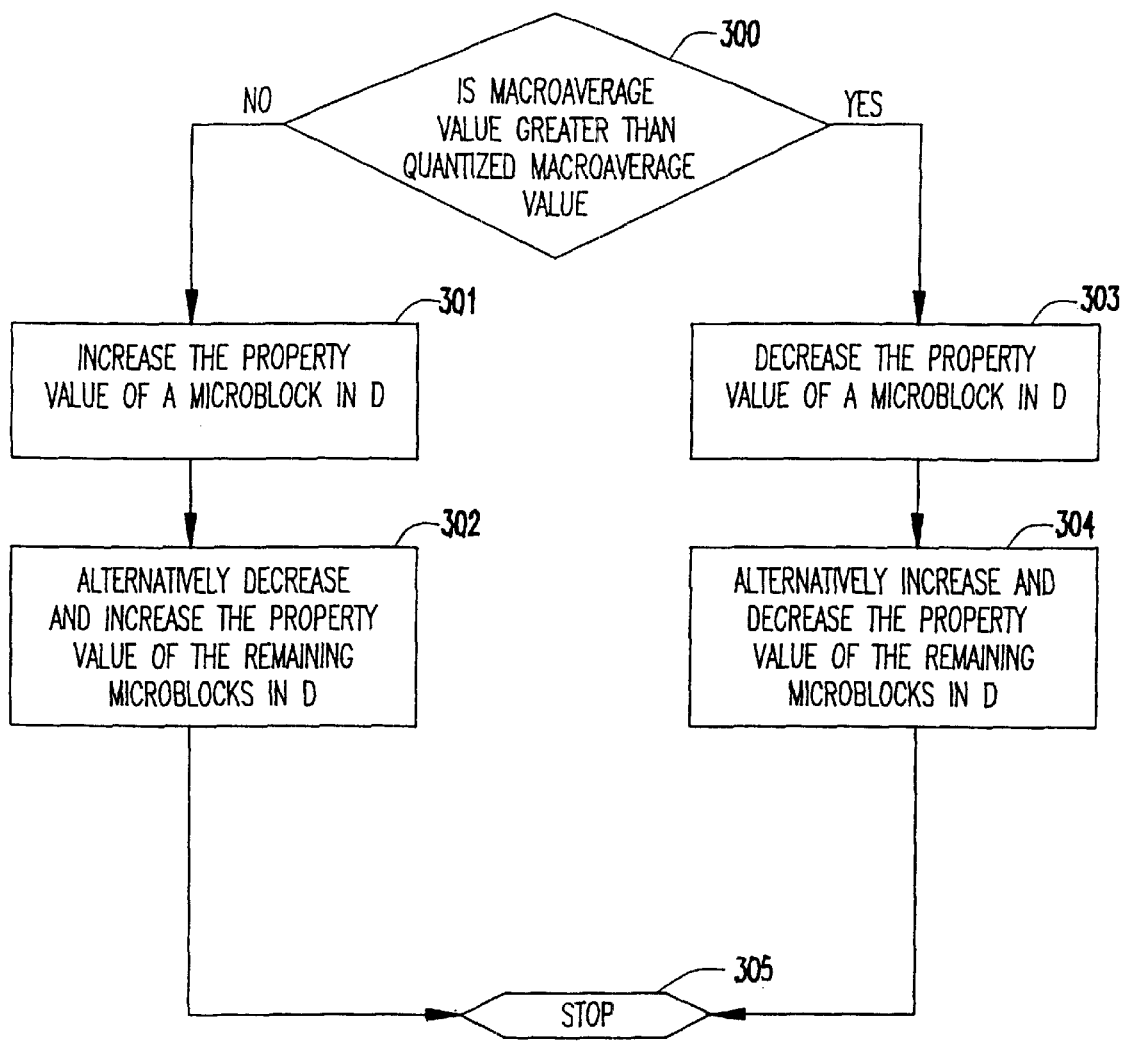
FIG. 3 is a flow chart showing the modification steps of the image blocks.

Referring now to FIG. 3, the method begins by comparing the "macroaverage value" to the corresponding quantized macroaverage value, as shown in decision block 300. The "macroaverage value" may not be the same as the initial macroaverage value, and would differ by i$\Delta$/M (or k$\Delta$/M), as indicated in function blocks 103 (or 107).

If the macroaverage value is greater than or equal to the quantized macroaverage value, then the property value of a D microblock is decreased by $\Delta$, as shown in function block 301, and the property value of the remaining D microblocks is alternatively increased and deceased, as shown in function block 302. On the other hand, if the macroaverage value is less than the quantized macroaverage value, then the property value of a D microblock is first increased by $\Delta$, as shown in function block 303, and the property value of the remaining D microblocks is alternatively increased and decreased, as shown in function block 304. The process then stops, as shown in function block 305.

The following examples illustrate how the method is implemented.

EXAMPLE 1

Let the lower bound of the property value=0
Let the upper bound of the property value=127
Let M=10, $\Delta$=1, $\gamma$=0.5
Let the mapping function "$f$" be such that odd values map to 1 and even values to 0.
Let the property value of individual blocks in a macroblock be:

$m(1)=27; m(2)=34; m(3)=0; m(4)=40; m(5)=127;$ $m(6)=0; m(7)=15; m(8)=127; m(9)=70; m(10)=0.$

Thus, the average property value of the above macroblock is I=44.0, and $I_1$=44.

Let the bit pattern corresponding to the above value of $I_1$ be:

1 0 0 0 1 1 1 1 1 0.

$A=\{m(3), m(6), m(10)\} \Rightarrow |A|=3$
$B=\{m(5), m(8),\} \Rightarrow |B|=2$
$C=\{m(1), m(2), m(4), m(7)\} \Rightarrow |C|=c=4$
$D=\{m(9)\} \Rightarrow |D|=d=1$
$A_0=\{m(3), m(10)\} \Rightarrow |A_0|=a_0=2$
$A_1=\{m(6)\} \Rightarrow |A_1|=a_1=1$
$B_0=\{m(5), m(8)\} \Rightarrow |B_0|=b_0=2$
$B_1=\{\ \} \Rightarrow |B_1|=b_1=0$ Now, $|a_1-b_1|=|1-0|=1$, and d=1.
So, $|a_1-b_1|\leq d$. Thus, proceed with embedding procedure with L=1.
Increase the property value of m(6) by $\Delta$ (=1).
Since (L>0) and |L|=1.
∴ Decrease property value of m(9) by $\Delta$ (=1).
Finally,

|  | m(1) | m(2) | m(3) | m(4) | m(5) | m(6) | m(7) | m(8) | m(9) | m(10) |
|---|---|---|---|---|---|---|---|---|---|---|
| Old Property Value | 27 | 34 | 0 | 40 | 127 | 0 | 15 | 127 | 70 | 0 |
| New Property Value | 27 | 34 | 0 | 40 | 127 | 1 | 15 | 127 | 69 | 0 |
| Embedded Bits | 1 | 0 | 0 | 0 | 1 | 1 | 1 | 1 | 1 | 0 |

∴ The embedded bit pattern is exactly the same as the one that was set out to embed. Also, the new average property value of the macroblock=44.0, which maps to 44.

EXAMPLE 2

Consider the same initial settings, except that the property values of individual microblocks which are:

$m(1)=27; m(2)=34; m(3)=0; m(4)=40; m(5)=127;$ $m(6)=0; m(7)=15; m(8)=127; m(9)=69; m(10)=0.$

Thus, the average property value of the above macroblock is I=43.9. Thus, $I_1=44$.
Let the bit pattern corresponding to the above value of $I_1$ be:

1 0 0 0 1 1 1 1 0.

A, B, $A_0$, $A_1$, $B_0$, $B_1$ are the same as in Example 1.

$C=\{m(1), m(2), m(4), m(7), m(9)\} \Rightarrow |C|=c=5$ $D=\{ \} \Rightarrow |D|=d=0$ Now, $|a_1-b_1|=|1-0|=1$, and d=0.
Now, check to see if there is an $i \in \{i: 43.9+0.1i \text{ maps to } 44 \text{ and } |1-i| \leq 0\}$.
Clearly, (i=1) satisfies this condition.
Hence, proceed with embedding procedure with $L=(a_1-b_1-i)=1-0-1=0$
∴ increase property value of m(6) by Δ (=1).
Since $|L|=0$,
∴ We need to change no other microblock.
Finally, Thus, the average property value of the above macroblock is I=44.2. Thus, $I_1=44$.
Let the bit pattern corresponding to the above value of $I_1$ be:

1 0 1 0 1 1 1 1 0.

$A_0=\{m(10)\} \Rightarrow |A_0|=a_0=1$ $A_1=\{m(3), m(6), m(7)\} \Rightarrow |A_1|=a_1=3$ $B_0=\{m(5), m(8)\} \Rightarrow |B_0|=b_0=2$ $B_1=\{ \} \Rightarrow |B_1|b_1=0$ $C=\{m(1), m(2), m(4), m(9)\}z,900 \ |C|=c=4$ Now, $|a_1-b_1|=|3-0|=3$, and d=0.
Now, check to see if there is an $i \in \{i: 44.2+0.1i \text{ maps to } 44 \text{ and } |3-i| \leq 0\}$
Clearly, no such i exists.
Now, let j=1. Then, $I_1+j\gamma=44.0+0.5=44.5$.
Let the new bit pattern be 0, 0, 0, 1, 0, 1, 1, 1, 0, 1.
Now, $A_0=\{m(3)\} \Rightarrow |A_0|=a_0=1$ $A_1=\{m(6), m(7), m(10)\} \Rightarrow |A_1|=a_1=3$ $B_0=\{m(8)\} \Rightarrow |B_0|=b_0=1$ $B_1=\{m(5)\} \Rightarrow |B_1|=b_1=1$ $C=\{m(2)\} \Rightarrow |C|=c=1$ $D=\{m(1), m(2), m(9)\} \Rightarrow |D|=d=3$ Now, check to see if there is a $k \in \{k: 44.2+0.1k \text{ maps to } 44.5 \text{ and } |3-k-i| \leq 3\}$.
Clearly, k=1, 2, 3, 4, 5 satisfy the above condition. Choose k=2, and embed with $L=(a_1-b_1-k)=3-1-2=0$

|  | m(1) | m(2) | m(3) | m(4) | m(5) | m(6) | m(7) | m(8) | m(9) | m(10) |
|---|---|---|---|---|---|---|---|---|---|---|
| Old Property Value | 27 | 34 | 0 | 40 | 127 | 0 | 15 | 127 | 69 | 0 |
| New Property Value | 27 | 34 | 0 | 40 | 127 | 1 | 15 | 127 | 69 | 0 |
| Embedded Bits | 1 | 0 | 0 | 0 | 1 | 1 | 1 | 1 | 1 | 0 |

∴ The embedded bit pattern is exactly the same as the one that was set out to embed. Also, the new average property value of the macroblock=44.1, which maps to 44.

EXAMPLE 3:

Consider the same initial settings, except the property values are $m(1)=27; m(2)=52; m(3)=0; m(4)=40; m(5)=127;$ $m(6)=0; m(7)=0; m(8)=127; m(9)=69; m(10)=0.$ Now, increase the property value of m(6), m(7) and m(10) by Δ (=1), and decrease the property value of m(5) by Δ (=1).

Since ($|L|=0$) and the new macroaverage value (=44.4) is less than the quantized macroaverage value (=44.5), in accordance with function blocks 301 and 302, the value of m(1) is increased by Δ, the value of m(4) is decreased by Δ, and the property value of m(9) is increased by Δ.

Finally,

|  | m(1) | m(2) | m(3) | m(4) | m(5) | m(6) | m(7) | m(8) | m(9) | m(10) |
|---|---|---|---|---|---|---|---|---|---|---|
| Old Property Value | 27 | 52 | 0 | 40 | 127 | 0 | 0 | 127 | 69 | 0 |
| New Property Value | 28 | 52 | 0 | 39 | 126 | 1 | 1 | 127 | 70 | 1 |
| Embedded Bits | 0 | 0 | 0 | 1 | 0 | 1 | 1 | 1 | 0 | 1 |

∴ Which is the pattern corresponding to new $I_1=44.5$.

Having thus described our invention, what we claim new and desire to secure by Letters Patent is as follows:

1. A computer-implemented method for embedding data in a digital image that is used to authenticate the image, comprising the steps of:
   a) dividing said image into groups of M rectilinear blocks;
   b) calculating a property value of each said block;
   c) defining a mapping function that maps said property value of each said block onto a 0 or a 1 bit;
   d) embedding said 0 or 1 bit associated to each said block in accordance with the following steps, with a variable $L=(a_1-b_1)$ when $|a_1-b_1|\leq d$, where $a_1$ is a number of microblocks with a first property value equal to a pre-specified lower bound value and having an inherently embedded bit opposite of a bit to be embedded, $b_1$ is a number of microblocks with a second property value equal to a pre-specified upper bound value and having an inherently embedded bit opposite of a bit to be embedded, d is a number of microblocks with a property value between said pre-specified lower bound value and said pre-specified upper bound value and having an inherently embedded bit opposite of a bit to be embedded, I is a macroaverage value, $I_1$ is a quantized macroaverage value, $\gamma$ is a macroblock property value interval, $\Delta$ is an amount by which a change in the microblock property value will not exceed, and D is a set of microblocks with a property value between said pre-specified lower value and said pre-specified upper value and having an inherently embedded bit opposite of a bit to be embedded:
   i) increasing $a_1$'s by $\Delta$;
   ii) decreasing $b_1$'s by $\Delta$;
   iii) increasing a property value associated with each of $|L|$ microblocks of D by $\Delta$ when $L<0$;
   iv) decreasing said property value associated with each of $|L|$ microblocks of D by $\Delta$ when $L\geq 0$; and
   v) adjusting the remaining D microblocks.

2. The method according to claim 1, wherein the adjusting step comprises the step of decreasing said property value of one said D microblock, and alternatively increasing and decreasing said property value of a number of said D microblocks that remain when a new macroaverage value is greater than said quantized macroaverage value, or increasing the property value of one said D microblock, and alternatively decreasing and increasing the property value of a number of said D microblocks that remain when a new macroaverage value is less than or equal to said quantized macroaverage value.

3. The method according to claim 1, further comprising the steps, upon satisfying $(a_1-b_1>d)$, of:
   e) determining if there is a value i, such that:

$i\in\{i:(I+i*\Delta/M) \text{ maps to } I_1\}$;

f) determining if $|(a_1-i)-b_1|\leq d$;
   g) embedding with $L=(a_1-b_1-i)$ upon satisfying steps e) and f), in accordance with the following steps:
   i) increasing $a_1$'s by $\Delta$;
   ii) decreasing $b_1$'s by $\Delta$;
   iii) increasing said property value associated with each of $|L|$ microblocks of D when $L\leq 0$;
   iv) decreasing said property value associated with each of $|L|$ microblocks of D when $L>0$; and
   v) adjusting the remaining D microblocks.

4. The method according to claim 3, wherein the adjusting step comprises the step of decreasing said property value of one said D microblock, and alternatively increasing and decreasing said property value of a number of said D microblocks that remain when a new macroaverage value is greater than said quantized macroaverage value, or increasing the property value of one said D microblock, and alternatively decreasing and increasing the property value of a number of said D microblocks that remain when a new macroaverage value is less than or equal to said quantized macroaverage value.

5. The method according to claim 3, further comprising the steps, upon satisfying $|(a_1-i)-b_1|>d$, of:
   h) computing $a_0, a_1, b_0, b_1,$ c and d corresponding to $I_1+j\gamma$, where $a_0$ is a number of microblocks with a property value equal to said pre-specified lower bound value and having an inherently embedded bit the same as a bit to be embedded, $b_1$ is a number of microblocks with a second property value equal to said pre-specified upper bound value and having an inherently embedded bit opposite of a bit to be embedded, c is a number of microblocks with a property value between said pre-specified lower value and said pre-specified upper bound value and an having an inherently embedded bit opposite of a bit to be embedded, and j is a counter parameter initialized to 1;
   i) determining if there is an integral value, k, such that:

$k\in\{k:(I+k*\Delta/M) \text{ maps to } |+j\gamma|\}$;

j) determining whether $|a_1-k-b_1|\leq d$
   k) repeating steps h)–j) for up to $j=\pm 1 \ldots \pm\Delta/\gamma$; and
   l) embedding with $L=(a_1-b_1-k)$ upon satisfying steps i) and j), in accordance with the following steps:
   i) increasing $a_1$'s by $\Delta$;
   ii) decreasing $b_1$'s by $\Delta$;
   iii) increasing said property value associated with each of $|L|$ microblocks of D when $L\leq 0$;
   iv) decreasing said property value associated with each of $|L|$ microblocks of D when $L>0$; and
   v) adjusting the remaining D microblocks.

6. The method according to claim 5, wherein the adjusting step comprises the step of decreasing said property value of one said D microblock, and alternatively increasing and decreasing said property value of a number of said D microblocks that remain when a new macroaverage value is greater than said quantized macroaverage value, or increasing the property value of one said D microblock, and alternatively decreasing and increasing the property value of a number of said D microblocks that remain when a new macroaverage value is less than or equal to said quantized macroaverage value.

7. The method according to claim 5, further comprising the steps, upon satisfying $|(a_1-k)-b_1|>d$, of:
   m) calculating $x_i=|(a_i-i)-b_i|-d_i$, for $-M\leq i\leq M$;
   n) calculating k such that $x_k=\min\{x_i\}$;
   o) decreasing the property value of up to $(|((a_1-k)-b_1|-d)/2)b_0$ or c microblocks by $2\Delta$ when $|(a_1-k)-b_1|>0$, and embedding with $L=d$ in accordance with the following steps:
   i) increasing $a_1$'s by $\Delta$;
   ii) decreasing $b_1$'s by $\Delta$;
   iii) increasing said property value associated with each of $|L|$ microblocks of D when $L\leq 0$;
   iv) decreasing said property value associated with each of $|L|$ microblocks of D when $L>0$; and
   v) adjusting the remaining D microblocks, or
   p) increasing the property value of up to $(|((a_1-k)-b_1|-d)/2)a_0$ or c microblocks by $2\Delta$ when $|(a_1-k)-b_1|\leq 0$, and embedding with L=−d in accordance with the following steps:

i) increasing $a_1$'s by $\Delta$;
ii) decreasing $b_1$'s by $\Delta$;
iii) increasing said property value associated with each of |L| microblocks of D when L≦0;
iv) decreasing said property value associated with each of |L| microblocks of D when L>0; and
v) adjusting the remaining D microblocks.

8. The method according to claim 7, wherein the adjusting step comprises the step of decreasing said property value of one said D microblock, and alternatively increasing and decreasing said property value of a number of said D microblocks that remain when a new macroaverage value is greater than said quantized macroaverage value, or increasing the property value of one said D microblock, and alternatively decreasing and increasing the property value of a number of said D microblocks that remain when a new macroaverage value is less than or equal to said quantized macroaverage value.

9. A computer program product comprising:

a computer usable medium having computer readable program code embodied in the medium for embedding data in a digital image that is used to authenticate the image, the computer program product having:

first computer program code for dividing said image into groups of M rectilinear blocks;

second computer program code for calculating a property value of each said block;

third computer program code for defining a mapping function that maps said property value of each said block onto a 0 or a 1 bit;

fourth computer program code for embedding said 0 or 1 bit associated to each said block in accordance with the following steps, with a variable $L=(a_1-b_1)$ when $|a_1-b_1|\leq d$, where $a_1$ is a number of microblocks with a first property value equal to a pre-specified lower bound value and having an inherently embedded bit opposite of a bit to be embedded, $b_1$ is a number of microblocks with a second property value equal to a pre-specified upper bound value and having an inherently embedded bit opposite of a bit to be embedded, d is a number of microblocks with a property value between said pre-specified lower bound value and said pre-specified upper bound value and having an inherently embedded bit opposite of a bit to be embedded, I is a macroaverage value, $I_1$ is a quantized macroaverage value, $\gamma$ is a macroblock property value interval, $\Delta$ is an amount by which a change in the microblock property value will not exceed, and D is a set of microblocks with a property value between said pre-specified lower value and said pre-specified upper value and having an inherently embedded bit opposite of a bit to be embedded:

i) increasing $a_1$'s by $\Delta$;
ii) decreasing $b_1$'s by $\Delta$;
iii) increasing a property value associated with each of |L| microblocks of D by $\Delta$ when L<0;
iv) decreasing said property value associated with each of |L| microblocks of D by $\Delta$ when L≧0; and
v) adjusting the remaining D microblocks.

10. A computer program product of claim 9, wherein said fourth computer program code adjusts the remaining D microblocks by decreasing said property value of one said D microblock, and alternatively increasing and decreasing said property value of a number of said D microblocks that remain when a new macroaverage value is greater than said quantized macroaverage value, or increasing the property value of one said D microblock, and alternatively decreasing and increasing the property value of a number of said D microblocks that remain when a new macroaverage value is less than or equal to said quantized macroaverage value.

* * * * *